Figure 1:
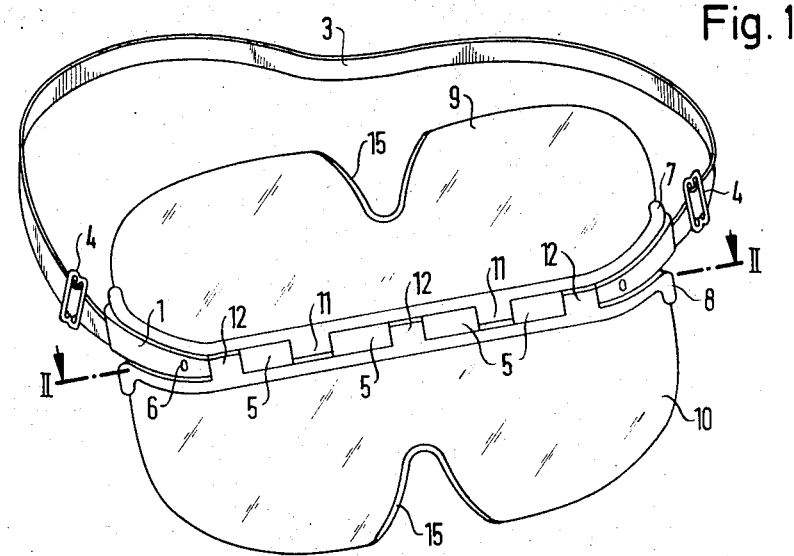

United States Patent
Marker

[11] 3,782,810
[45] Jan. 1, 1974

[54] INDIVIDUALLY SELECTIVELY USEABLE ANTI-GLARE GOGGLE GLASSES

[76] Inventor: Hannes Marker, Hauptstrasse 51-53, Garmisch-Partenkirchen, Germany

[22] Filed: Dec. 15, 1971

[21] Appl. No.: 208,204

[30] Foreign Application Priority Data
Dec. 18, 1970  Germany ............... G 70 46 891.6

[52] U.S. Cl. ............ 351/47, 2/14 J, 2/14 XS, 351/57, 351/58
[51] Int. Cl. ............ G02c 9/02, A61f 9/02
[58] Field of Search ......... 351/47, 48, 57, 58, 351/59; 2/14 XS, 14 J

[56] References Cited
UNITED STATES PATENTS
3,252,747   5/1966   Robins ........................... 351/57
2,686,310   8/1954   Schweikert ..................... 2/14 XS FOREIGN PATENTS OR APPLICATIONS
452,266   8/1936   Great Britain ................. 351/47
459,277   9/1950   Italy ............................. 2/14 XS

*Primary Examiner*—Paul A. Sacher
*Attorney*—Martin Fleit et al.

[57] ABSTRACT

The goggles are particularly intended for use by skiers and comprise a goggle glass holder, which is adapted to bear on the head of the skier. The goggle glass holder carried two selectively usable goggle glasses or goggle glass units, which are so related to each other that one goggle glass or goggle glass unit is disposed in front of the eyes of the wearer and the other is disposed in front of his forehead when the goggles are in position of use.

5 Claims, 3 Drawing Figures

PATENTED JAN 1 1974    3,782,810

INDIVIDUALLY SELECTIVELY USEABLE ANTI-GLARE GOGGLE GLASSES

This invention relates to goggles, particularly for use by skiers, which goggles comprise a goggle glass holder, which is adapted to bear on the head of the skier.

Goggles which are particularly designed for use by persons engaged in sports activities should generally serve several purposes: They should protect the eyes of the wearer from light rays, from an ingress of foreign matter and from wind. To protect the eyes from light rays, particularly from axcessive brightness, the goggle glasses are normally tinted in a dark color.

Because the sight and radiation conditions often vary, e.g., during skiing, and may change quickly, a single tint of the goggle glasses is usually not sufficient when it is desired that the wearer should be afforded a sufficiently good vision and adequate protection of his eyes from light rays.

On the other hand, the wearer, e.g., a skier, should not have to own goggles having different tints and to carry them along during skiing. For this reason, goggles have been disclosed which are sold together with two goggle glasses or two sets of goggle glasses having different tints. These goggle glasses are interchangeable so that the skier need not carry a second pair goggles along but only the spare goggle glass or glasses when he desires to have suitable, properly tinted goggles available on the skiing course at any time.

In practice, however, this proposal involves disadvantages which highly reduce the utility of such goggles.

The most important disadvantage of these goggles resides in that the skier may forget to carry the additional goggle glasses along and, if he does carry them along, they will require space in the pockets of his garments and may easily be broken, e.g., in a fall or when he sits down carelessly. Another disadvantage of these goggles resides in that a frequent interchange of the goggle glasses results in a wear or deformation of the elements by which they are retained to the goggle glass holder so that the goggle glasses are no longer held firmly enough. The goggle glasses themselves may also be easily damaged as they are interchanged. Such damage may result in a loss of the goggle glasses and in injury to the eyes by a goggle glass which flies off.

It is an object of the invention so to improve and design goggles of the kind mentioned first hereinbefore that the disadvantages of the known goggles are avoided in a simple manner and yet the goggles perfectly serve their intended purpose, namely, to protect the eyes and to afford an optimum vision.

In goggles which are particularly suitable for skiers and which comprise a goggle glass holder, which is adapted to bear on the head of the wearer, this object is accomplished according to the invention in that the goggle glass holder carries two selectively usable goggle glasses or goggle glass units, which are so related to each other that one goggle glass or one goggle glass unit is disposed in front of the eyes of the wearer and the other is disposed in front of his forehead when the goggles are in position of use. These goggles do not require an inconvenient replacement of the goggle glasses or goggle glass units because the skier who desires an adaptation to different sight and radiation conditions must only bring the required goggle glass or goggle glass units in front of his eyes. Besides, the problems related to the accommodation of the additional goggle glasses and the risk of destruction thereof is eliminated.

The simplest possibility to arrange the proper goggle glass or goggle glass unit in front of the wearer's eyes is to apply the goggles in the proper position. To ensure that the goggle glass holder will always bear properly on the head of the wearer, the goggle glass holder is suitably symmetrical to its horizontal center plane.

In a development of the invention it has proved particularly desirable to provide the goggle glass holder with a hinged mount for each goggle glass or goggle glass unit. The two mounts may be combined in a unit.

If the hinge axis or axes of the mounts extends or extend in or parallel to the main planes of the goggle glass holder and of the goggle glasses to form one or respective horizontal transverse axes when the goggles are in position of use, the angular position of the goggle glasses or goggle glass units relative to the head of the wearer can be changed so that the goggles can better be adapted to the shape of the head or to the desires of the wearer.

When it is desired to move the desired goggle glass or goggle glass unit in front of the eyes of the user without changing the position of the goggles, this is desirably enabled in that the hinge axis of the mounts extends in or parallel to the main plane of the goggle glass holder so that this axis is horizontal and extends at right angles to the transverse direction of the goggles when these are in position of use, and that at least one arbitrarily releasable rotation-preventing locking means is provided between the goggle glass holder and the mounts. In this embodiment of the goggles, the same may be held on the head of the wearer by bows which engage the wearer's ears from behind. The rotation-preventing locking means may suitably consist of a detent device which comprises one part fixed to the goggle glass holder and another part fixed to the mounts.

If goggles do not comprise rotatably mounted goggle glasses or goggle glass units as just described and yet are to be provided with two bows which engage the ears of the wearer from behind when the goggles are being worn and which are hinged to the goggle glass holder, it has been found desirable to use another embodiment of the invention in which a swivel joint is provided between the hinge connecting each bow to the goggle glass holder and the bow portion which engages the ear from behind and the axis of said swivel joint extends in the longitudinal direction of the bow. In this way, the bow portions which engage the eyes from behind may be rotated to its proper position for use regardly of what goggle glass or goggle glass unit is required at a time.

Figure 2:
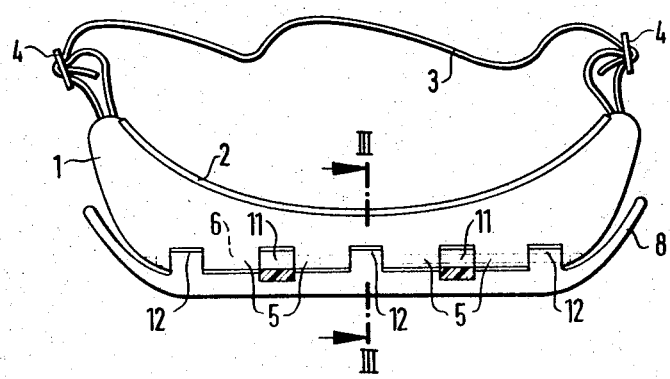
Figure 3:
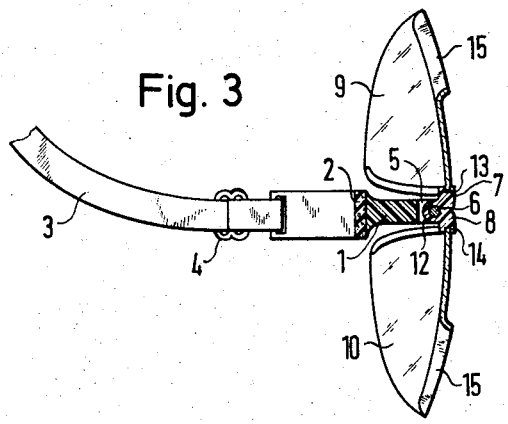

An embodiment of the invention will now be described in detail and by way of example with reference to the accompanying drawing, in which FIG. 1 is a perspective view showing goggles according to the invention viewed in an oblique direction from the forward side, FIG. 2 is a sectional view taken on line II—II in FIG. 1 and FIG. 3 is a transverse sectional view taken on line III—III in FIG. 2.

The goggles which are shown comprise a goggle glass holder 1, which consists of plastics material and which is curved on that side which is intended to bear on the forehead of the wearer. On that side, the holder is provided with a pad in the form of a strip of foam rubber 2. The goggle glass holder 1 is provided at each of its lateral ends with an eyelet.

An elastic band 3 has free ends, which are threaded through these eyelets, and serves to hold the goggles on the head of the wearer. To enable an adaptation to heads differing in size, the end portions of the band are threaded through respective adjusting buckles 4, which are held on the band. This arrangement is known and need not be described in detail.

On that side which is remote from the head of the wearer when the goggles are in position of use, the goggle glass holder 1 comprises four spaced apart bearing eyes 5. A rod 6 extends through these bearing eyes. Two bowlike mounts 7, 8 for respective goggle glasses 9, 10 are mounted on those sections of the rod 6 which extend out of the bearing eyes. For this purpose, the mounts have two or three bearing eyes 11 or 12, which are similar to the bearing eyes 5. Each goggle glass 9 or 10 is held in a groove 13 or 14 (see FIG. 3) of the mount 7 or 8 and extends substantially approximately at right angles to the horizontal plane of the goggle glass holder. To afford a lateral protection to the eyes of the wearer, the goggle glasses are slightly curved. Each goggle glass has a central recess 15 for the nose. The goggle glasses 9 and 10 have a yellow tint for brightening and a brown tint for protection against radiation, respectively.

Depending on the prevailing light conditions, the user may apply the goggles in such a manner that the brown, darker goggle glass or the yellow, lighter goggle glass is in front of his eyes. The goggle glass which is not required at a time is then disposed in front of the forehead of the wearer and is neither disturbing nor endangered. Because the mounts 7, 8 for the goggle glasses 9, 10 are hinged to the goggle glass holder 1, the wearer may select any desired angular position of the goggle glasses relative to his face.

It may be emphasized that each goggle glass may be provided with a continuous peripheral padded mount rather than the mount which is shown and this mount may be pivotally moved to bear on the face of the wearer so that his eye region is perfectly shielded.

What is claimed is:

1. Goggles, particularly useable by skiers, comprising a goggle glass holder shaped to bear against the head of the wearer, two selectively usable goggle glasses, said goggle glasses each having different tints, and means for mounting each of said goggle glasses to said goggle glass holder, said goggle glasses being simultaneously mounted to said goggle glass holder in such manner that each one of said goggle glasses can selectively be positioned in front of the eyes of the wearer when in use to the exclusion of the other, and such that one of said goggle glasses is positioned in front of the eyes of the wearer when the other of said goggle glasses is positioned in front of the forehead of the wearer.

2. Goggles according to claim 1, in which the goggle glass holder is symmetrical with respect to its horizontal center plane.

3. Goggles according to claim 1, in which the goggle glass holder has a hinged mount for each of the goggle glasses.

4. Goggles according to claim 3, in which both of the mounts are combined in a unit.

5. Goggles according to claim 3, in which the hinge axis of the mounts extends parallel to the main plane of the goggle glass holder and of the goggle glasses to form horizontal transverse axes when the goggles are in use.

* * * * *